Nov. 15, 1938.   B. WALKER   2,136,570
MOTOR VEHICLE
Filed Feb. 8, 1935   4 Sheets-Sheet 1

INVENTOR.
Brooks Walker
BY

Nov. 15, 1938.  B. WALKER  2,136,570
MOTOR VEHICLE
Filed Feb. 8, 1935  4 Sheets-Sheet 2

INVENTOR.
Brooks Walker
BY

Nov. 15, 1938.    B. WALKER    2,136,570
MOTOR VEHICLE
Filed Feb. 8, 1935    4 Sheets-Sheet 3

INVENTOR.
Brooks Walker
BY

Nov. 15, 1938.   B. WALKER   2,136,570
MOTOR VEHICLE
Filed Feb. 8, 1935   4 Sheets-Sheet 4
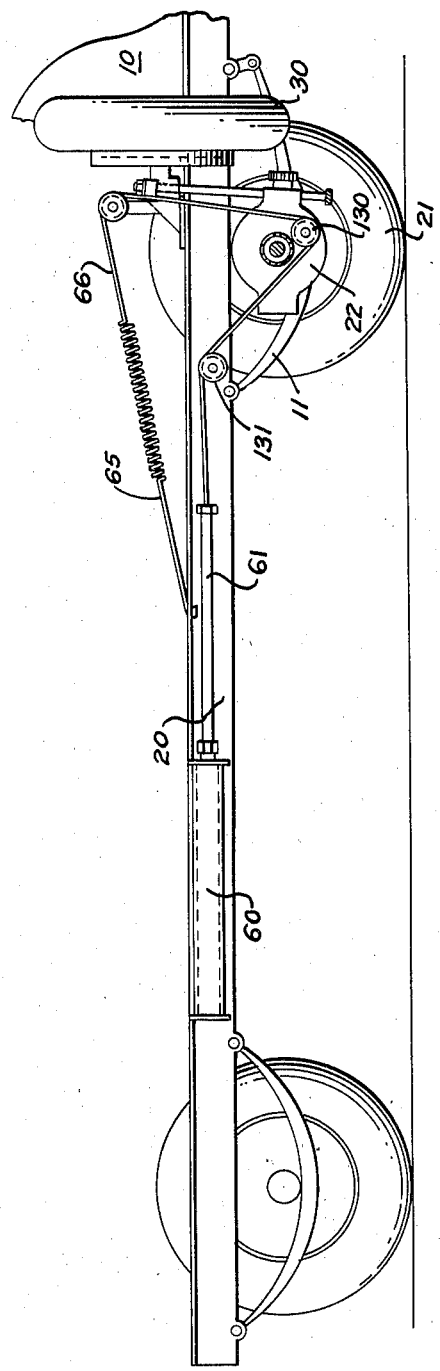
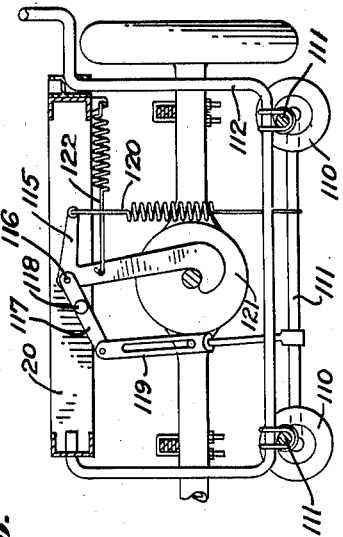
INVENTOR.
Brooks Walker Patented Nov. 15, 1938

2,136,570

UNITED STATES PATENT OFFICE 2,136,570

MOTOR VEHICLE

Brooks Walker, Piedmont, Calif.

Application February 8, 1935, Serial No. 5,643

12 Claims. (Cl. 180—1)

Part of this application pertains to a structure first disclosed in my co-pending case entitled Vehicle lifting and traversing device, filed June 26th, 1932, Serial No. 677,565.

My invention relates to improvements in motor vehicle, and lifting and traversing devices therefor, luggage compartment, fuel tank locations, tire covers, etc., and their improved construction, location and arrangement, and more particularly to vehicle lifting and traversing devices employing the spare wheel as the lifting and traversing means wherein said spare wheel is located within the contour of said vehicle body preferably ahead of the luggage space provided within said body, an improved location for the fuel tank either back of the rear seat above the frame, or in the more novel location nested within the streamline contour of modern type wheel fenders; to provide an improved lifting mechanism wherein the clearance between the elevated wheels and the vehicle chassis is reduced during the lifting operation thereby reducing to a minimum the vertical movement of the lifted portion of the vehicle to attain a given clearance between the elevated wheels and the road surface; to improve the contour and appearance of tire covers in connection with a lifting and traversing device employing the spare wheel; to improve and simplify the driving and supporting mechanism for a lifting and traversing device employing this spare wheel; to provide ready access to the spare wheel for tire change when located within the vehicle body including a luggage compartment at the same time to provide a dust tight luggage compartment.

Other objects and features of novelty of my invention will be either specifically pointed out or will become apparent when referring, for a better understanding of my invention, to the following description in conjunction with the accompanying drawings, wherein;

Figure 8 is an elevation view looking toward the rear axle partly in section showing an alternative form of my invention showing the auxiliary wheels in their vehicle raised position.

Figure 9 is a side elevation view partly in section and partly cut away showing an alternative form of my invention applied to a vehicle chassis with the spare wheel in its raised inactive position.

Figure 1:
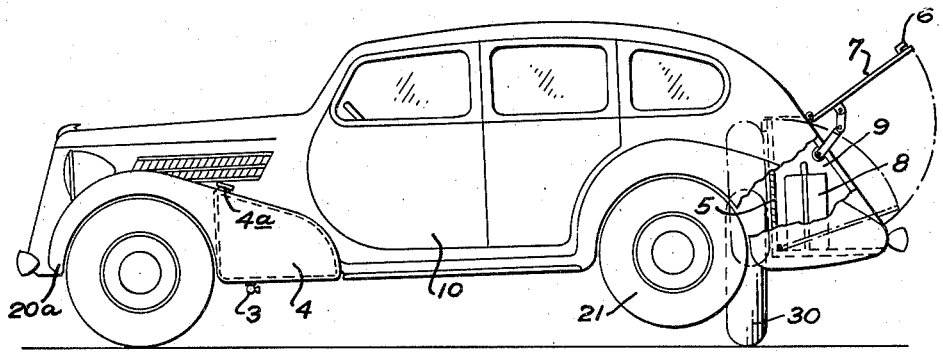
Figure 1 is a side elevation partly cut away and partly in section showing one form of my invention with the spare wheel in the vehicle raised position.

Referring to Figures 1, 2, 3, 4, and 5, I have shown a motor vehicle with a body 10, frame 20, rear wheels 21, a rear axle assembly 22, on which is mounted a torque tube 23. A spare tire 30, is mounted on a spare wheel 31, shown in some views as a disc wheel which is rotatably mounted on an axle bracket 32, which axle bracket 32, is slidably mounted on two guide rods 33, and 34. The upper end of said guide rods are secured to a cross member 35, and having extensions 36 and 37, at each end thereof which are mounted within substantially vertical guide slots 38 and 39 of brackets 40 and 41 respectively. Said brackets 40 and 41 being rigidly secured to the cross member 20A of the vehicle frame. Said cross member 35 carrying an extension 35A which is in abutting relation with coil spring 50, which constantly urges the guide rods 33 and 34 rearwardly.

The rear axle assembly 22 carries an auxiliary driving shaft 19 which may be an extension of the main drive shaft if the hypoid or worm drive is employed as described in my U. S. patent entitled Vehicle lifting and traversing device, #2,005,173. Said shaft 19 carries at its rear end a driving gear 17. As illustrated said shaft 19 is connected with an auxiliary pinion.

A cylinder 60, is preferably attached to the torque tube 23 and is actuated by engine power in some suitable manner such as that described in connection with my U. S. Patent 2,005,173, previously referred to.

Figure 2:
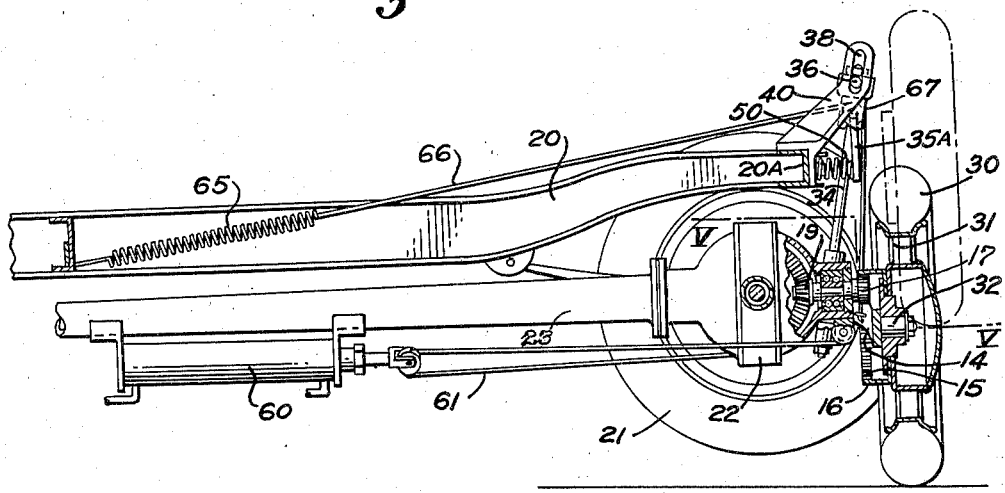
Figure 2 is a side elevation view partly cut away and partly in section showing the details of construction of the supporting and driving mechanism for the spare wheel of Figure 1.
Figure 3:
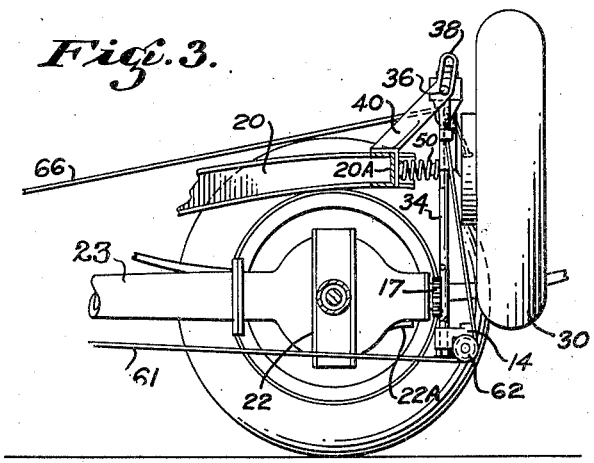
Figure 3 is a side elevation view partly cut away and partly in section of some of the mechanisms of Figure 2, showing the spare wheel in its retracted inactive position.
Figure 4:
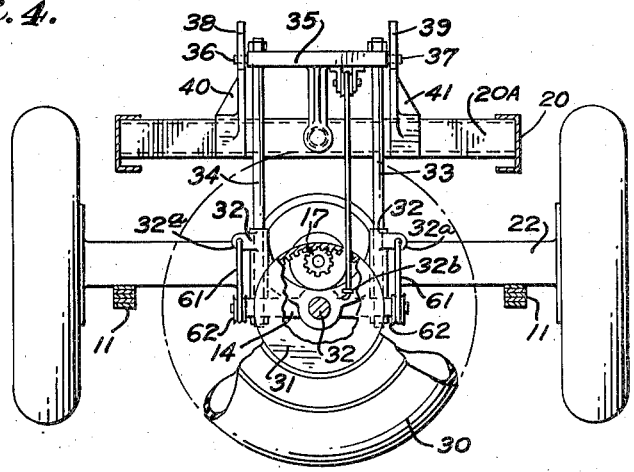
Figure 4 is a rear elevation view partly in section and partly cut away, of the mechanism illustrated in Figure 2.

The spare wheel 31 is rigidly attached to a brake drum-shaped member 16. Rigidly secured with the said member 16 is an internal gear 15. As the piston in the cylinder assembly 60 is forced forward by engine supplied fluid pressure the cable 61 is drawn around the pulleys 62 causing the axle bracket 32 to move downward carrying the spare wheel assembly with it. This is effected by the upper ends of the cables 61 being anchored to extension brackets 32A on the axle bracket 32. With the first increase in tension in the cable 61 the pulleys 62 are pulled toward the rear axle assembly 22 causing the lower cross member 14 which ties the guide rods 34 and 33 together at their lower ends to engage the axle housing just under the bearing for the shaft 19 as shown in Figure 2, said contact being curved as shown in Figure 4 to take care of side gear thrust. This forward movement is limited by the stop 22A on the rear axle assembly 22.

There preferably exists a slight clearance between the cross member 14 and the auxiliary pinion housing prior to the contact of the spare wheel 30 with the road surface. This clearance will vary with the loading of the car. As the spare wheel contacts the ground this last mentioned clearance will be eliminated as the pins 36 and 37 move upwardly in the slots 38 and 39 to allow the vehicle to be lifted on the spare tire through the rear wheel supporting springs as the car is lifted through the cross member 14 the rear axle assembly 22 and the rear springs 11 thus providing a sprung ride while the car is being lifted or traversed on the spare tire.

It is to be noted that due to the angular placement of the guide rods 33 and 34 during the vehicle lifting operation that the spare tire and wheel 30 and 31 move downward at an inclined plane, as shown in Figure 2. The plane of the spare wheel 30 being at an angle to the plane of the guide rods 33 and 34 thereby providing clearance between the lower edge of the gear 15 and its support 16, with the gear 17, while forming a driving engagement with the upper interior teeth of the gear 15 and the gear 17, thereby eliminating numerous gears previously necessary to form a driving connection between the rear axle and the spare wheel.

The spare wheel is retracted to its inactive position by the spring 65, one end of which is anchored to the vehicle frame 20 and the other end being attached to the cable 66, which passes over the pulley 67 and is attached to the axle bracket 32 at 32B.

If necessary for rear seat or floor board clearances the pulley 67 may be lowered slightly or the anchorage point of the spring 65 may be lowered to bring the spring 65 and its associated cable 66 below said floor boards, seats etc.

In connection with Figure 1 I have shown a luggage compartment 9 in which is placed for example's sake a suitcase 8. Said luggage space is reached through a rear opening door 7 provided with a handle 6, as shown in the raised position of Figure 1. Access to the spare tire is gained through the door 5 in the back of the luggage compartment which is hinged at the bottom and opens to the dotted position shown in Figure 1.

In order to improve the size of the luggage compartment 9, to provide suitable space for the spare wheel 30 and its associated mechanism, I have preferred to locate the fuel tank 4 within the streamline rear contour of the front fender or fenders 20A, said fuel tank can be formed integral with said fender 20A thereby eliminating extra weight, or may be formed separately and be made removable to facilitate servicing and fender straightening. Said fuel tank may be filled through cap 4A and is provided with an outlet 3, which in the event of two fuel tanks in each front fender would be connected with the other fuel tank and the carbureter intake would be preferably taken from the lowest point in said connecting line.

While I have shown the fuel tank in connection with the front fenders it may likewise be nested in the rear fender contour. By this location I have taken advantage of the space available in present design and have improved greatly the luggage compartment in connection with an inclosed mounting for the vehicle spare tire.

Figure 6:
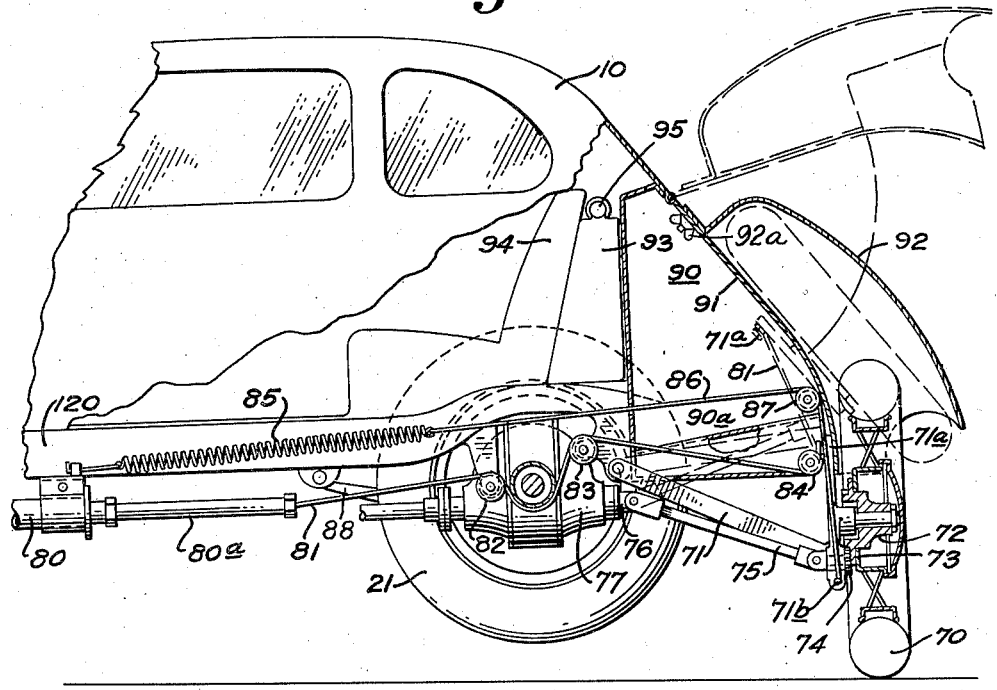
Figure 6 is a side elevation partly cut away and partly in section of an alternative form of my invention showing the spare wheel in its vehicle lifted position at the rear of the vehicle body and showing in dotted line the wheel in its raised position and also the luggage compartment cover and tire cover in its raised position.

In Figure 6 I have illustrated an alternative type of construction wherein the spare wheel 70 is mounted on a wishbone 71 similar in construction to that described in my Patent No. 2,005,173, previously referred to.

The wheel supporting hub 72 carries gear teeth 73, in driving contact with a gear 74 which is connected with an auxiliary drive shaft 75 by means of a universal joint and spline connection and may be in continuous driving connection with a shaft 76 extending from the rear of the rear axle housing 77 and may be driven in a manner such as described in connection with Figure 16 of my U. S. Patent No. 1,884,933, dated October 25th, 1932.

The actuating cylinder 80 is connected with a lifting cable 81 which runs over pulley 82 under the axle housing 71, at its center point as shown, provided the differential location is slightly off center or with a central differential location said cable 81 could pass diagonally under the center of said differential housing to provide a central lifting effort, in which case possibly two differential mounted pulleys would be necessary. The cable 81 may slidably engage said axle housing or said housing may be provided with a pulley bearing thereon or with the pivot of said pulley being the rear axle housing 77A. Said cable 81 then passes over pulley 83, under pulley 84 and is attached to extension 71A of the wheel supporting wishbone. A retracting spring 85 is attached at one end to the vehicle frame 20 and at the other end to a cable 86 which passes over a pulley 87 and is attached to a lower bracket 71B of the wishbone 71. In actuation as the cylinder 80 retracts the piston rod 80A, the cable 81 will take up the slack necessary under the rear axle housing 77 which allows normal rear spring action and will cause the spare wheel 70 to be lowered into ground contact against the action of the retracting spring 85 and its associated cable 86. As the cable 81 tends to lift the rear end on the vehicle spare tire 70, the cable pull will approximately equal the weight of the rear end of the vehicle at the spare tire end. By virtue of the pulleys 82 and 83 a vertical component lift will be exerted on the rear axle housing 77, that will exceed the normal rear vehicle weight on said axle housing 77 and will cause axle housing 77 to move closer to the vehicle frame 20 against the action of the rear springs 88, thereby providing a clearance between the rear vehicle wheels 21 and the ground with a reduced vehicle lift as compared with that previously necessary when the vehicle was lifted by mechanism either supported on the rear axle or on the frame with hooks for lifting the rear axle. This may provide a pleasanter sensation for the passengers in the rear seat than the larger lift previously necessary.

In connection with this body design I have preferred to show a luggage compartment 90 covered by a door 91, hinged at the upper end thereof and having attached thereto, preferably by manual wing nuts 92a, a metallic tire cover 92 with a curved section covering said tire 70 in its raised position, said curve being substantially as shown in Figure 6 in full line taken approximately through the center of said tire cover, said curve being preferably of the same contour through a section at right angles to allow arcuate movement of said spare tire in raising or lowering. In this construction I have shown the possible location of the fuel tank 93 between the luggage compartment 90 and the rear seat 94 as an alternative location to that shown in Figure 1. Said fuel tank 93 may be filled by filler neck 95 extending through the vehicle body above the rear wheel. However, if the fuel tank is placed as shown in Figure 1 the space occupied in Figure 6 may be used for additional luggage space.

In Figure 6 it is to be understood that the wing nuts 92a for holding the tire cover 92 may be applied from inside of the door 91, to improve appearance. In this event in case it is desired to remove the spare tire, the tire is lowered into the vehicle lifted position, in which position the upper portion of the tire is below, and so clears, the lower marginal edge of the door 91. With the tire thus lowered the door 91 and tire cover 92 may be raised, the wing nuts unscrewed from the tire cover, the tire cover removed, the door 92 closed and the wheel retracted to its inactive raised position, from where it can be removed by the usual method.

By this construction it is also possible to form the tire cover integral with the door 91 if the tire 70 is to be removed; the tire 70 is lowered, the door 91 raised and then the tire 70 is retracted with the door 91 and tire cover 92 in their lifted position, which allows access to the tire or wheel attached bolts.

The tire cover 92 is preferably carried on the door 91 which allows access to the luggage compartment 90 and moves therewith when said door 91 opens after the spare wheel 70 has been lowered to its vehicle lifting position.

A "tunnel" 90A may be provided to allow further movement of the wishbone 71 and the drive shaft 75 during rear axle spring movement. In this connection, to minimize interference with luggage space the wishbone 70 is preferably as narrow in spread as structure permits and lies within the tunnel of the luggage floor when the tire 70 is in the raised position.

Cable 86 may likewise pass through a housing if necessary to protect baggage and a further closure over cable 81 and arm 71 may be provided likewise if necessary.

In Figures 1 to 6, though not shown, it is assumed the pulleys will be guarded to prevent the cables from coming off track while slacked or operating, likewise in Figure 6, if a torque tube is used, as shown in Figure 2, a dividing cable would centralize the lift on the axle by passing one of the cables on each side of the differential housing thereby causing the rear axle to lift parallel to the vehicle chassis.

Figure 5:
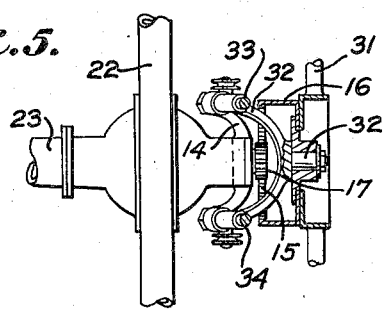
Figure 5 is a plan view partly in section taken through section 5—5 of Figure 2.
Figure 7:
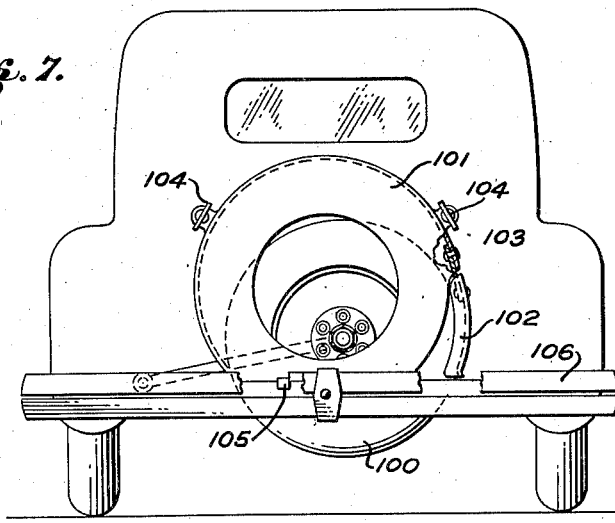
Figure 7 is a rear elevation view of a motor vehicle incorporating a particular form of tire cover embodying my invention.

In Figure 7 I have shown an alternative type of tire cover in connection with a spare tire mounting, said spare tire mounting being similar to that shown in Figures 5 and 6 of my Patent No. 2,005,173, previously referred to.

The spare tire 100 is shown in its partially lowered position forcing the spring supported door 102 of the tire cover 101 open against the action of the spring attachment 103. The tire cover may be secured to the vehicle body by the wing nuts 104 and the clips 105 attaching the tire cover to the body and the back bumper 106 respectively. The spare wheel may be lowered by means of cables and pulleys such as shown in connection with Figure 6 to effect the same rear axle lift rather than the cylinder location shown in Figure 5 and the application previously referred to.

In the event that the tire moves substantially vertically downward such as shown in Figure 6, two doors such as 102, would be necessary on each side of the tire cover to allow the tire cover to closely hug the tire diameter for the major portion of said diameter, as illustrted in Figure 7, said door or doors 102 are actuated by contact with the tire 100 during the raising and lowering operation, and preferably do not contact the spare tire 100 when in the vehicle raised position so as not to interfere with its rotation when in this position.

Figure 8 is the same substantially as Figure 7 of my co-pending application Serial No. 677,565, previously referred to.

In Figure 8 we have a vehicle frame 20, auxiliary wheels 110, an axle support for said wheels 111, and a lifting mechanism 112 which slidably engages the axle rod 111. A hook 115 is pivoted at 116 to link 117, which is pivoted to the vehicle frame at 118. One end of the link 117 is attached to the axle 111 by means of the lost motion link 119. One end of hook 115 is connected to a spring 120, which, in turn, is connected to the axle 111. The other end of hooks 115 is disposed to engage over an abutment carried by axle 121. In action, as the wheels 110 are lowered into vehicle raised position, spring 120 will first cause hook 115 to engage the rear axle housing 121 and the lost motion link 119 will cause the arm 117 to rotate after the wheels 110 have contacted the road surface to cause the rear axle 121 to be lifted through the hook 115 toward the frame 20 as the wheels 110 lift the vehicle frame 20 further, thus providing a faster lifting rate for the lifted vehicle wheels than for the vehicle frame during the vehicle lifting operation. When wheels 110 are raised to their normal retracted position, the return spring 122 swings hook 115 out of engagement with the axle housing.

In Figure 9 I have shown a slight modification of the lifting cable hook-up for a construction similar to that shown in Figures 1, 2, 3, 4, and 5 wherein the pulley or pulleys 62 have been transferred from the cross rod 14 to a position shown, as pulley 130 mounted on the rear axle housing 22 together with another pulley 131, so that cable 66 lifts the one end of the vehicle on the tire 30 through the rear springs 11 but with an additional load applied to the rear axle housing 22 to cause the rear springs 11 to be compressed more than normally during the vehicle lifting operation to provide a faster lift for the rear wheels 21 than for the frame 20. The angle of the cable 66 between the pulleys 130 and 131 preferably being such as to exert an additional compressing force on the rear springs 11, of that normally applied when supporting the vehicle, to effect a further compression thereof during the vehicle lifting operation.

While I have described and illustrated several embodiments of my invention, it will be apparent to those skilled in the art that various changes, additions, omissions and substitutions may be made therein without departing from the spirit and scope of my invention, as set forth in the accompanying claims.

I claim:

1. A device for lifting one end of a vehicle on the spare tire thereof, said vehicle having a differential at the lifting end for driving the wheels at that end of the vehicle, a driving means including a pinion extending outwardly from said differential housing away from the center of said vehicle, an internal gear rigidly attached to said spare tire to rotate directly therewith and on the same axis as said spare tire, and means for moving said internal gear into driving engagement with said pinion only when said spare tire is lowered into ground engagement.

2. A device for lifting one end of a vehicle on the spare tire thereof, said vehicle having a differential at the lifting end for driving the wheels at that end of the vehicle, a driving means extending outwardly from said differential housing away from the center of said vehicle, a gear attached to said spare tire to rotate directly therewith, means for directly connecting said driving means and said gear when spare tire is lowered into ground engagement, said gear being of the internal type and supported in such a manner than when lowered the lower edge thereof misses said driving means, the upper teeth of said internal gear engaging said driving means when said spare tire is completely lowered, said driving means remaining in relatively the same fore and aft position during the lowering operation of said spare tire.

3. A vehicle including a frame, a rear axle, a torque member attached to said rear axle, a lifting device carried by said vehicle for lifting one end of said vehicle on a ground engaging element, an engine power actuated mechanism for actuating said lifting device, said mechanism being mounted on said torque member and exerting a lifting force directly on said rear axle during the operation of said lifting device, said ground engaging element being supported on and moving with said frame when said element is in the inactive position.

4. In combination a vehicle, a lifting device, a vehicle frame, a rear axle, a torque member secured to said axle, said lifting device carried by said vehicle for lifting one end of said vehicle, a fluid cylinder for actuating said lifting device, said cylinder mounted on said torque member and exerting a lifting force directly on said rear axle during the lifting operation of said lifting device.

5. A vehicle including supporting wheels, a frame, resilient connections between said wheels and said frame, a device including a supporting ground engaging member disposed for movement between a retracted position and a lowered ground engaging position in which it lifts one end of said vehicle, said device including means for substantially reducing the vertical clearance between said vehicle frame and the axis of the elevated vehicle wheels during the lifting operation, said device being so arranged that the supporting member is supported from the vehicle frame when said member is in its retracted position.

6. A vehicle including a sprung portion, an unsprung portion, wheels, wheels forming a portion of said unsprung portion and being attached to said sprung portion by resilient means, a device carried by the vehicle and including a ground engaging element movable between a retracted position and a lowered ground engaging position in which it lifts one end of said vehicle, said lifting device being arranged to apply a direct lifting force to said unsprung portion during the vehicle lifting operation, and being so arranged that said ground engaging element is supported from the vehicle sprung portion when said element is in its retracted position.

7. A vehicle having a sprung portion resiliently attached to its supporting wheels, a spare tire, a device carried by said vehicle and including a spare tire movable between a retracted position and lowered ground engaging position in which it lifts one end of said vehicle, means rendering said device effective to apply a lifting force directly to said resilient means, said means acting to reduce the vertical clearance between said sprung portion of said vehicle and the axis of the elevated vehicle wheel during the lifting operation by said device, said device being so arranged that the spare tire is supported from the vehicle frame when the spare tire is in its retracted position.

8. A vehicle including a sprung portion comprising a frame, an unsprung portion including road wheels, a lifting device including a ground engaging member movable between a retracted inactive position and a lowered active position in which lowered position it is effective to lift one end of the vehicle, and means connected to the frame for supporting the lifting device, said means being movable so that when the lifting device is in its active position the lifting force thereof on the vehicle is applied through the unsprung portion.

9. A motor vehicle including a body, a luggage compartment, a spare tire, a mounting for said spare tire which is movable to move said spare tire into engagement with the roadway for raising one end of said vehicle and to move said spare tire to a retracted position, and a door for said luggage compartment having means connected thereto for enclosing said spare tire and having a projecting element formed thereon, said retracted position of said spare tire being such that said spare tire lies in the path taken by said element when said door is opened, so that said spare tire when retracted blocks said element and prevents said opening movement of said door.

10. A vehicle including a frame structure adapted to carry a vehicle body, road wheels and an axle structure therefore, resilient means for connecting said axle structure to the frame, an auxiliary wheel, mechanism for supporting said auxiliary wheel upon the vehicle adjacent one end thereof and for actuating it between a raised inactive position and a lowered active position in which lowered active position the auxiliary wheel lifts one end of the vehicle, said mechanism including means connected to the vehicle frame so that when the auxiliary wheel is in its raised position it is supported directly by the frame and including means cooperating with the resilient means so that when the auxiliary wheel is in its lowered position the mechanism applies a lifting force directly through the resilient means to the vehicle frame.

11. A vehicle including a frame structure adapted to carry a vehicle body, road wheels and an axle structure therefor, resilient means for connecting said axle structure to the frame, an auxiliary wheel, mechanism for supporting said auxiliary wheel upon the vehicle adjacent one end thereof and for actuating it between a raised inactive position and a lowered active position in which lowered active position the auxiliary wheel lifts one end of the vehicle, said mechanism including means connected to the vehicle frame so that when the auxiliary wheel is in its raised position it is supported directly by the frame and including means cooperating with the resilient means so that when the auxiliary wheel is in its lowered position the auxiliary wheel applies a lifting force directly through the resilient means to the vehicle frame.

12. A vehicle including a frame structure adapted to carry a vehicle body, road wheels and an axle structure therefor, resilient means for connecting said axle structure to the frame, an auxiliary wheel, mechanism for supporting said auxiliary wheel upon the vehicle adjacent one end thereof and for actuating it between a raised inactive position and a lowered active position in which lowered active position the auxiliary wheel lifts one end of the vehicle, said mechanism including means connected to the vehicle frame so that when the auxiliary wheel is in its raised position it is supported directly by the frame and including means cooperating with the resilient means so that when the auxiliary wheel is in its lowered position the mechanism applies a lifting force directly through the resilient means to the vehicle frame and causes the auxiliary wheel to apply a lifting force directly to the frame.

BROOKS WALKER.

Patent No. 2,136,570  Granted November 15, 1938
BROOKS WALKER

The above entitled patent was extended April 24, 1951, under the provisions of the act of June 30, 1950, for 6 years and 214 days from the expiration of the original term thereof.

*Commissioner of Patents.*